United States Patent
Richter

[11] Patent Number: 5,923,626
[45] Date of Patent: Jul. 13, 1999

[54] RECORDING OR PLAYBACK DEVICES FOR OPTICAL INFORMATION CARRIERS HAVING A DIFFERENT TRACK WIDTH

[75] Inventor: Hartmut Richter, Villingen-Schwenningen, Germany

[73] Assignee: Dsutsche Thomson-Brandt GmbH, Villingen-Schwenningen, Germany

[21] Appl. No.: 08/622,984

[22] Filed: Mar. 27, 1996

[30] Foreign Application Priority Data

Apr. 22, 1995 [DE] Germany .......................... 195 14 881

[51] Int. Cl.$^6$ ..................................................... G11B 7/095
[52] U.S. Cl. ................................... 369/44.23; 369/44.29; 369/44.37; 369/58
[58] Field of Search .............................. 369/44.23, 44.29, 369/44.35, 44.37, 54, 58

[56] References Cited

U.S. PATENT DOCUMENTS

| | | | |
|---|---|---|---|
| 4,532,522 | 7/1985 | Tsunoda et al. . | |
| 5,140,577 | 8/1992 | Ohsato | 369/44.37 |
| 5,184,340 | 2/1993 | Kachi et al. | 369/44.37 |

FOREIGN PATENT DOCUMENTS

| | | |
|---|---|---|
| 0459420 | 12/1991 | European Pat. Off. . |
| 0525896 | 2/1993 | European Pat. Off. . |
| 5-234107 | 9/1993 | Japan . |

*Primary Examiner*—W. R. Young
*Attorney, Agent, or Firm*—Joseph S. Tripoli; Eric P. Herrmann; Ronald H. Kurdyla

[57] ABSTRACT

The present invention to provides for information carriers of different storage densities, a recording and/or playback device which is compatible or can be used for different optical information carriers despite a functional relationship which to be satisfied between the size of the information memory location or pit size and the size of the light spot, without changing the wavelength of the laser used or changing the numerical aperture of the objective lens. In order to operate optical information carriers of different storage densities, use is made of an optical system which has a wavelength and numerical aperture matched to the highest storage density, provides a plurality of secondary beams matched to the respective track width, and has a number of secondary beam detector pairs which corresponds to the number of different information carriers. The information or data signal of an optical information carrier of relatively low storage density in the compatible recording and/or playback device is then reconstructed by detecting the rise in the signal of the information carrier which is detected from the information carrier by the main beam.

5 Claims, 6 Drawing Sheets

RECORDING OR PLAYBACK DEVICES FOR OPTICAL INFORMATION CARRIERS HAVING A DIFFERENT TRACK WIDTH

The invention relates to a compatible recording and/or playback device for playing back and/or recording information on optical information carriers of different storage density.

BACKGROUND OF THE INVENTION

In the future ever higher storage capacities and data rates will be required for computers and for devices in consumer electronics as well as in the multimedia field. In the case of optical memories, a higher storage capacity can be achieved by reducing the information memory locations and the light spot which scans the information layer. For this purpose, it would be necessary, for example, to use light having a shorter wavelength or an objective lens having a higher numerical aperture. Since laser diodes having an arbitrarily short wavelength are not, however, available, these two methods can also be combined. The information memory locations on the information carrier, which are designated as pits in the case of the CD, can then be shorter, on the one hand, and the distance to the neighbouring track can be reduced, on the other hand, without undesired crosstalk thereby occurring. Furthermore, optical information carriers such as, for example, read-only systems, rewritable disk systems, phase-change disks, magneto-optical disks or optical information carriers yet to be expected differ from one another in the method of information storage, which methods frequently also permit different storage densities. However, it is not directly possible by means of a system for reading out from information carriers having a relatively high storage capacity to read a disk having a lower density, that is to say larger pits and a larger track pitch, or to write information on it.

On the one hand, the pits or information memory locations representing data are too large, in comparison with the scanning light spot with the result that intensity modulation in the reflected light occurs only at the initial and final edges of the pits and, on the other hand, in the case of the use of the so-called three-beam track following method, which is generally used for track guidance, a changed adjustment of the secondary or auxiliary beams provided for the track guidance is necessary because of the different track pitch.

SUMMARY OF THE INVENTION

It is therefore the object of the invention to provide, despite information carriers of different storage density, a recording and/or playback device which is compatible or can be used for different optical information carriers despite a functional relationship to be satisfied between the size of the information memory location or pit size and the size of the light spot, without changing the wavelength of the laser employed or the numerical aperture of the objective lens.

In particular, the aim of increasing the quantity of information which can be stored on an information carrier leads to information carriers of higher storage density or memory structures with smaller dimensions. As already mentioned, means are known which permit the realization of optical information carriers, similar to CDs and MODs, of higher storage density, and also render corresponding recording and playback devices possible. In this context, the invention serves, in particular, to specify, in spite of a putative incompatibility with an individual recording and/or playback device, a solution which renders it possible to operate information carriers customary to date even in devices for information carriers of higher storage capacity. A method and a device are specified which render it possible to use, in just one device, both information carriers having a storage density corresponding to the present norm and information carriers of higher storage density, without this requiring the wavelength of the laser used or the numerical aperture of the objective lens to be changed.

It is an aspect of the invention to use only one optical system or the same optical system to ensure track guidance according to the three-beam track following method even for optical information carriers having different information track widths or different track pitches, and it is a further aspect of the invention to render playback possible with a lower storage density of stored information despite not having carried out matching between the size of the light spot and the size of the information memory location or the pit size.

This is achieved by means of a compatible recording and/or playback device which is produced in such a way that use is made of an optical system which is matched to the maximum storage density with respect to wavelength and size of light spots and which in addition to the grating provided for forming three beams from a laser beam has in the beam path of the scanning unit at least additional secondary beam detectors and, if appropriate, a second grating or further gratings. The second grating can be provided with the first grating on a substrate, the grating structures being at an angle to one another in order to make secondary beams available for different track widths. This additional grating, or further additional gratings are used to generate additional secondary beams which are at a distance from one another which is matched to the respective track width. This additional grating or else the further gratings are left continuously in the beam path, so that a multiplicity of secondary beams for information carriers of different track pitch or different track width are permanently directed onto the information carrier. Track following in conjunction with two likewise additional detectors for two systems is achieved using one scanner by adjusting the additional grating to the larger track pitch. The signals of the corresponding detectors are then evaluated as track guidance signal or track error signal.

In order to render possible playback of information stored at a lower storage density despite not having carried out matching between the size of the light spot and the size of the information memory location or the pit size, signals which represent the information being designated as data below, a detector is used to detect a data signal, recorded with a higher density in a known way. In order to provide the data signal recorded with a lower density, the data signal is guided via a means which evaluates the rise in a signal, in order to generate a data signal corresponding to the actual information on the information carrier of lower density. During scanning of the information carrier of lower density by means of a comparatively smaller spot, the signal obtained by the detector is initially falsified since, for exemple, the principle of destructive interference, used so far for scanning, is not effective because of the incorrect matching of the size of the light spot and pit size. In the case of a CD, this falsification of the detected signal can be advantageously corrected using a flipflop. A data signal is provided which corresponds to the data signal which would be produced upon playback in a playback device and which corresponds to the storage density of the information carrier. For a sampling device which uses the so-called three-beam principle for the track guidance, in the beam path a means is provided with the aid of which two additional beams can be imaged on the disk. These additional beams are in this case at a distance from one another which is matched to the wider tracks of the information carrier of lower information storage density. Furthermore, these beams are assigned detectors by means of which a corresponding track error signal is obtained in a known way. The result of this is that information carriers of different information storage density can be played back on a playback device. In order to act in the envisaged way on the beam path in the recording and/or playback device, use is made neither of a laser providing light of a different wavelength nor of an objective lens having a changed numerical aperture, and yet it is possible to use only one optical system in one device to operate information carriers of different storage density and, if appropriate, also of different storage type. Thus, it is advantageously possible to produce compatible recording and/or playback devices which are suitable for operating with information carriers of different storage density and, if appropriate, also of different storage type.

A special case may also be mentioned which obtains when the storage densities of the information carriers differ by an integral multiple. In this specific case, it is not necessary to provide an additional grating in the beam path of the optical system, since then the secondary beams of higher order which are already generated with only one grating can be used for the purpose of track guidance.

It is therefore possible to conceive in an advantageous way devices which, for example, render it possible both to operate a video disk having a high storage density and to operate an audio disk having a low storage density in a device having only one optical system.

However, the use of the invention is not restricted to information carriers of the same storage type and having different information storage densities, but is also possible for information carriers of different storage type having different or identical information storage densities.

BRIEF DESCRIPTION OF THE DRAWINGS

The invention is explained in more detail below, with the aid of exemplary embodiments, in drawings, in which.

DETAILED DESCRIPTION OF THE PREFERRED EMBODIMENTS

Figure 1A:
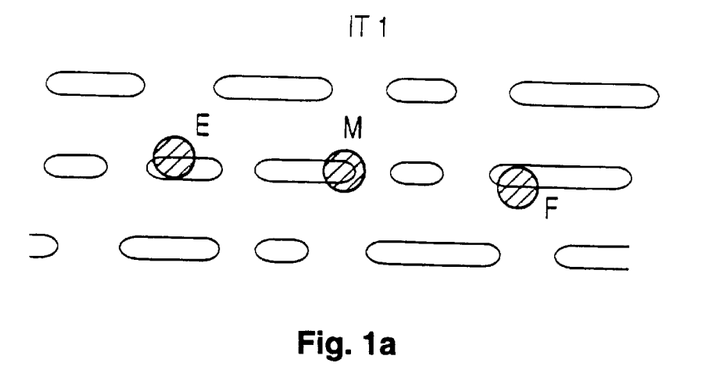
FIGS. 1A and 1B show schematic sketches of tracks and spots for information carriers having different storage densities.
Figure 1B:
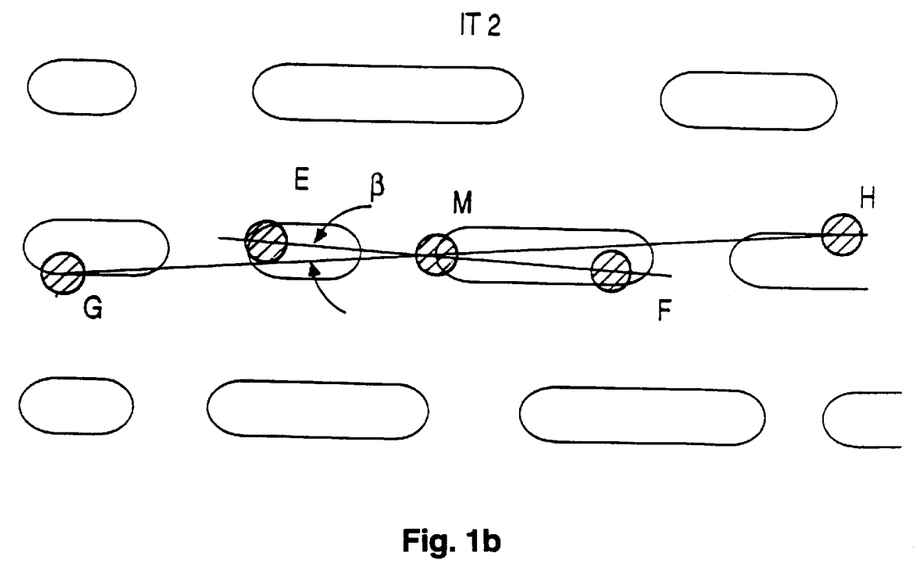

In the schematic sketch in accordance with FIG. 1, tracks and spots are represented for information carriers IT1, IT2, which have different storage densities, and which despite different storage densities or track widths of the information carriers IT1 and IT2 permit track guidance according to the 3-beam track following method using just one optical system. By comparison with the second information carrier IT2 in accordance with FIG. 1b, the first information carrier IT1 represented in FIG. 1a has a higher storage density, which results from a smaller pit size or size of memory location and a smaller track pitch. The first information carrier IT1 may be, for example, a video disk, and the second recording, carrier IT2 may be, for example, an audio disk. Information is recorded on the audio disk or CD or compact disk in digital form as a spiral track of successive depressions, the so-called pits. The track pitch of optical information carriers of the present CD standard is 1.6 $\mu$m, and the pits have a width of 0.6 $\mu$m as well as a depth of 0.12 $\mu$m, and the length of a pit or the distance between two pits varies in the range between 0.9 and 3.3 $\mu$m, compare Philips tech. Rev. 40, 1982, No. 6, page 156. These standard values also apply to the mini disk. The higher storage capacity of the minidisk is not achieved by a higher storage density of the information carrier but by compressing the information before recording. For the purpose of optical scanning and/or recording of pits of smaller dimensions and having a smaller track pitch, it is necessary to focus the laser beam onto the disk with a smaller size of light spot. In this case, the size of the light spot is determined both by the numerical aperture of the objective lens and by the wavelength of the laser light, and a smaller light spot diameter or a smaller size of the light spot can thus be achieved by using a light source of shorter wavelength. Semiconductor lasers presently used have a wavelength of 780 nm. However, semiconductor lasers are already known which provide light with a wavelength of only 30 nm. A quantitative leap is expected from optical frequency doublers, so-called second harmonic generator crystals. They permit a halving of the irradiated wavelength. The power loss occurring thereby can be compensated by a higher laser power. It is advantageous to combine a shorter wavelength and increased numerical aperture. However, neither can the numberical aperture be increased at will, since then the system becomes critical with regard to tilting of the disk and optical imaging errors additionally occur. In order, nevertheless, to be able to use a higher numerical aperture in order to produce a smaller light spot diameter, the substrate thickness of the information carrier is reduced, as is provided, for example, for a digital video disk (DVD) or super density disk (SD) to be expected. Whereas a numerical aperture of 0.45 is used for the known CD, a numerical aperture of 0.6 then becomes possible for the DVD in conjunction with acceptable sensitivity of the system to tilting of the disk.

The use of a smaller light spot or a light source of shorter wavelength to scan optical information carriers would, however, have the result that information carriers of the present CD standard cannot be played back using such devices. The reason for this is the principle of destructive interference used for scanning. The principle of destructive interference consists in that optical scanning of the pits, which are formed merely by depressions in a uniformly reflecting layer, is achieved by focusing the scanning light spot in such a way that the light component reflected outside a pit is approximately the same as the light component reflected from the depression and the light components extinguish one another by destructive interference, with the result that an attenuation of the intensity can be evaluated as a scanning signal. There exists between the pit size or size of the storage structure and the size of the light spot a functional relationship which is to be satisfied and which, for other reasons, is also to be satisfied in the case of optical information carriers of phase-change type or others. This applies partly also to a magneto-optic information carrier, the so-called MOD, in which the information storage or playback of information is based essentially on rotation of the direction of polarization of the light. Although the ratio between the magnitude of the magnetic domains and the size of the light spot need not be observed with the accuracy applying to the pits, it is also necessary here to take account of a certain functional relationship in the case of information carriers of different storage density, in particular with regard to information carriers having a reduced track pitch.

Figure 2:
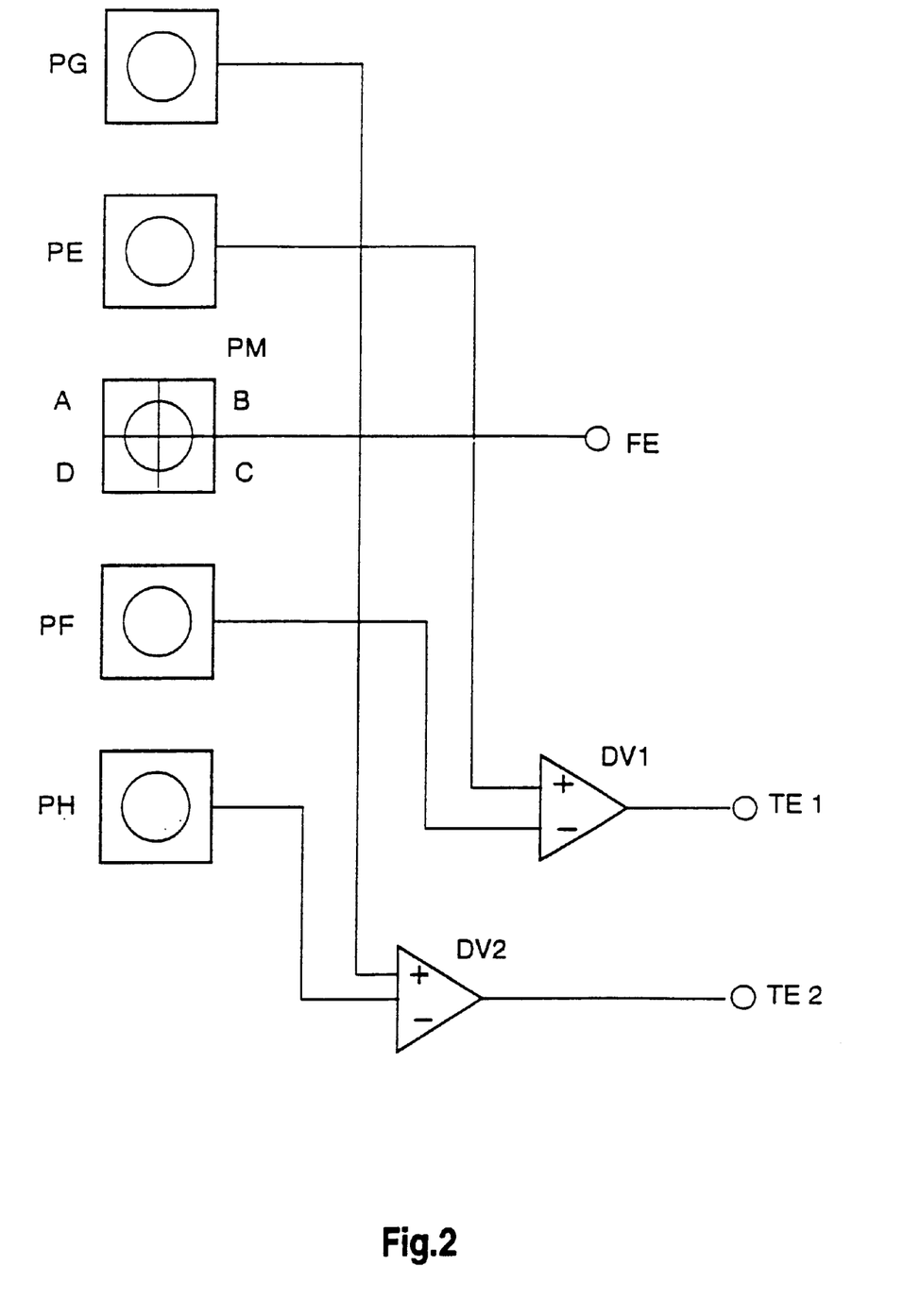
FIG. 2 shows a schematic sketch of a detector arrangement and the formation of a track guidance signal.
Figure 4:
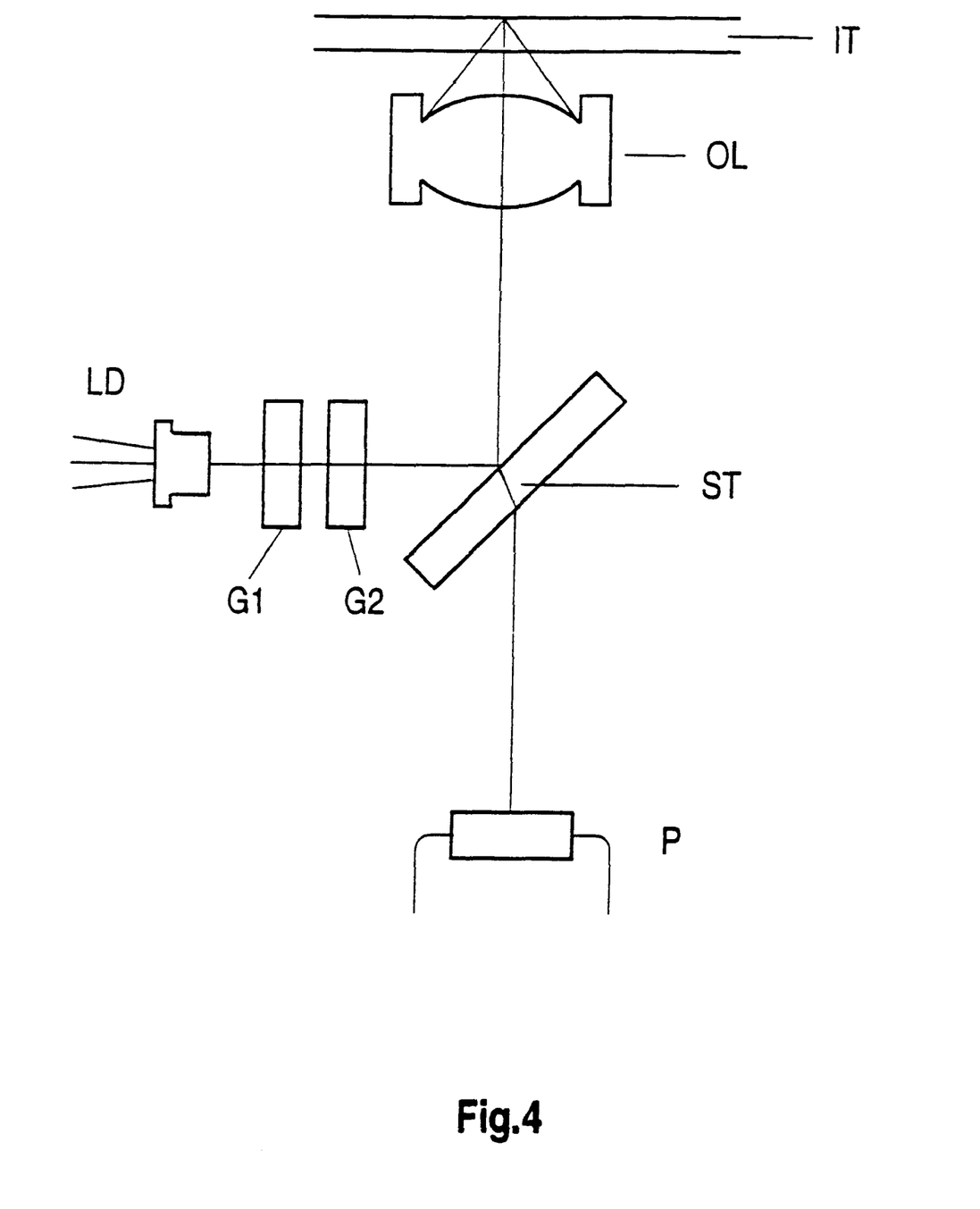
FIG. 4 shows a schematic sketch of an arrangement for data signal playback and track guidance of different information carriers, having only one scanning direction.
Figure 5:
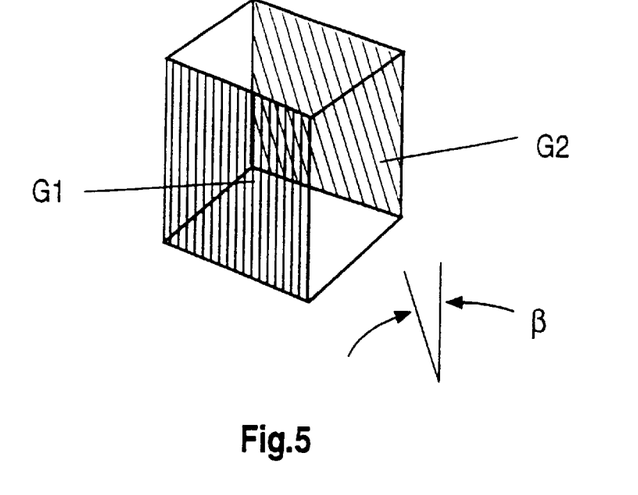
FIG. 5 shows a schematic sketch of the grating arrangement.

Secondary beams E, F suitable for track guidance are to be provided in accordance with FIG. 1a in such a way that the light spot formed by the secondary beams E, F are centred onto the edges of the pits, with the result that their centre point is approximately at half the distance of the width of the pit in relation to a centre line (not represented) of the pit. The secondary beams E, F are provided in a leading or trailing fashion, respectively, relative to the main beam or main light spot M. This arrangement results from splitting up the laser beam by means of a grating into the main beam M and the secondary beams E and F. The arrangement of the light spot, formed by the secondary beams E, F, with its centre point at the edge of the pits is required for the purpose of providing a track guidance or track error signal. The alignment of the light spot formed by the secondary beams E and F with the centre point at the pit edge is undertaken in order to achieve as large a detection signal as possible. In the case of such an adjustment, the light reflected from the information carrier is subjected to a maximum influence by the pits. This results from the use of the phenomenon of destructive interference, which has already been addressed and is likewise used for track guidance. In order to generate a track guidance error signal, the signal of the secondary beam leading the main light spot M is compared with that of the signal detected by the trailing secondary beam. Filters are used for this purpose, but are not represented in FIG. 2. If the three-beam system in accordance with FIG. 1a, which is provided for an information carrier IT1 of high storage density, is also to be used to read a recording carrier of relatively low storage density in accordance with the information carrier IT2 and FIG. 1b, secondary beams G, H are like-wise to be positioned at the edge of the pit. These secondary beams G, H are at a distance from a centre line (not represented) of the pits which likewise corresponds to half the pit width. This distance is increased by comparison with the distance represented in FIG. 1a. The secondary beams E and F are likewise represented in FIG. 1b in a fashion analogous to FIG. 1a. Since the secondary beams E and F in FIG. 1b do not occur with their centre points at the pit edge, a detection signal emanating from them will be substantially smaller than the signal detected by means of the secondary beams G and H. The auxiliary beams E and F as well as G and H are illustrated in FIG. 1 with auxiliary lines extending through the centre point of the main beam M and enclosing an angle $\beta$. The secondary beams E, F, G, H required for track guidance in conjunction with information carriers IT1, IT2 of different storage density are generated by means of an optical system represented in FIG. 4. The optical system in accordance with FIG. 4 comprises a laser diode LD, which provides the laser beam, two gratings G1, G2 arranged in the beam path to a beam splitter, the beam splitter ST, an objective lens OL, the information carrier IT and a detector P. In accordance with FIG. 2, the detector has five detectors, the detectors PE–PF, PH–PG being provided for the purpose of detecting the secondary beams E to H. These detectors include a detector PM, which is provided for the main beam M and is constructed as a four-quadrant detector ABCD. Both the information signal and a focus error signal FE are provided by means of this central detector. The detectors PE, PF and PG, PH are respectively connected to a differential amplifier DV1 and DV2, respectively, for the purpose of forming a track error signal TE1 and TE2, respectively. In accordance with the respective information carrier IT1, IT2, use is then made of the track error signal TE1, TE2 provided by the respective differential amplifier DV1, DV2. Provided in accordance with FIG. 4 for the purpose of generating the secondary beams E to H are two gratings G1, G2, whose grating lines are at an angle $\beta$ relative to one another in accordance with FIG. 5. In accordance with FIG. 5, the gratings G1, G2 can be arranged on a substrate or be provided as individual gratings G1, G2.

It may be mentioned in this connection that a second grating G2 is not required if information carriers IT1, IT2 differ from one another by an integral multiple with regard to their storage density or the pit width, since one grating G1 suffices to generate secondary beams of higher order, which correspond to an integral multiple, in addition to the secondary beams G, F. In order to be able to operate such information carriers IT1, IT2 in a playback device, only additional photodetectors PG, PH then have to be provided.

In addition to these statements for two different information carriers IT1, IT2, the principle is to be applied correspondingly to a plurality of different information carriers IT1 . . . ITn with a corresponding number of gratings and detectors.

Figure 3A:
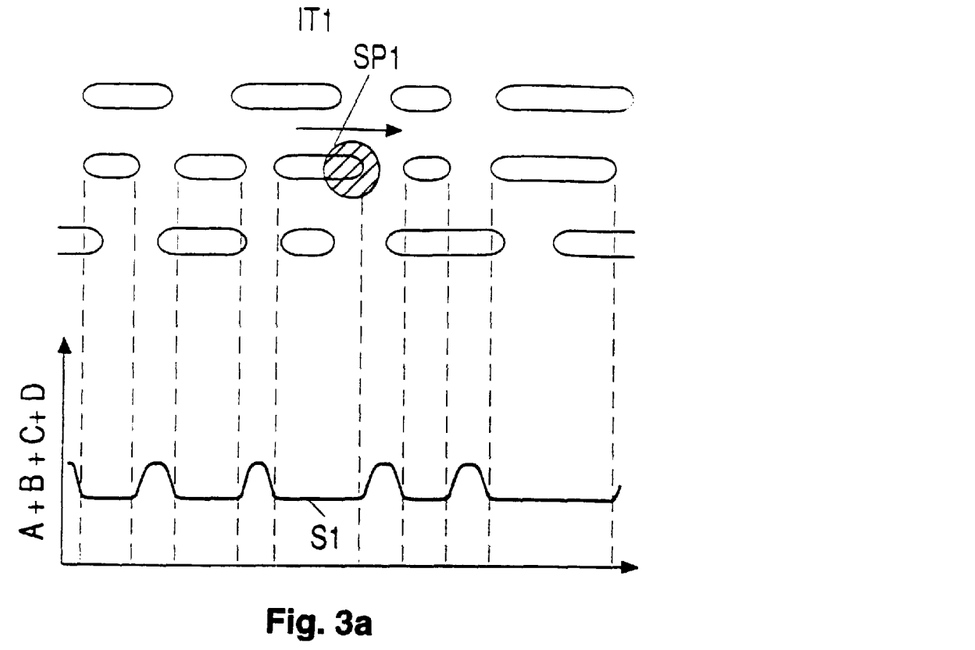
FIGS. 3A and 3B show schematic sketches of data signal sampling for information carriers having different storage densities.
Figure 3B:
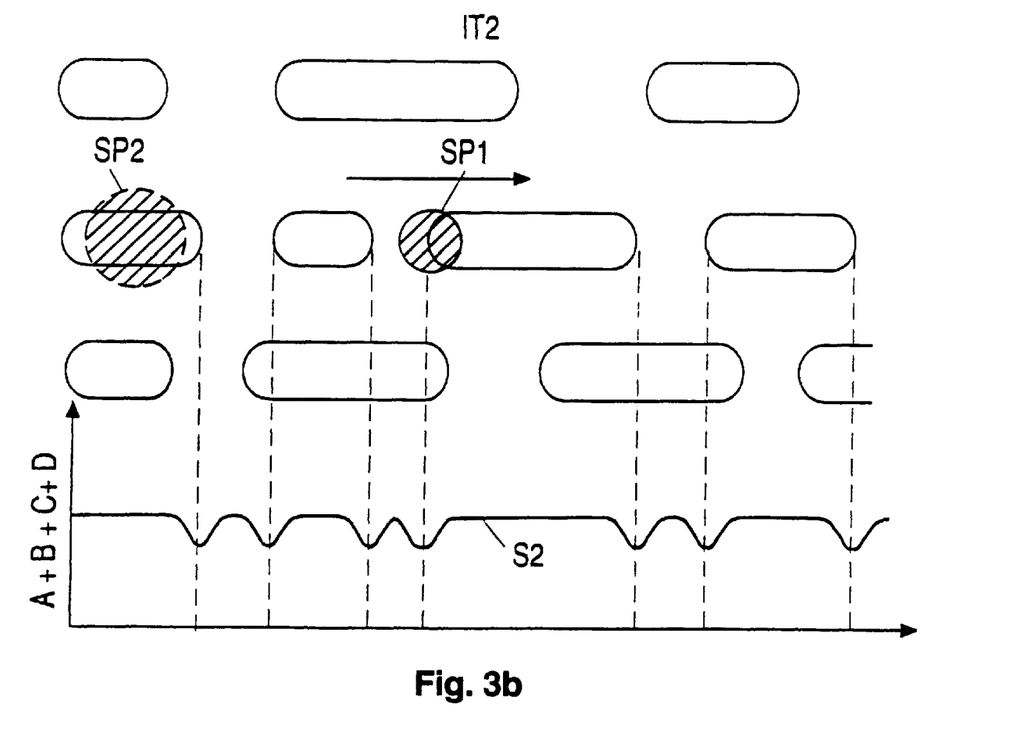
Figure 6:
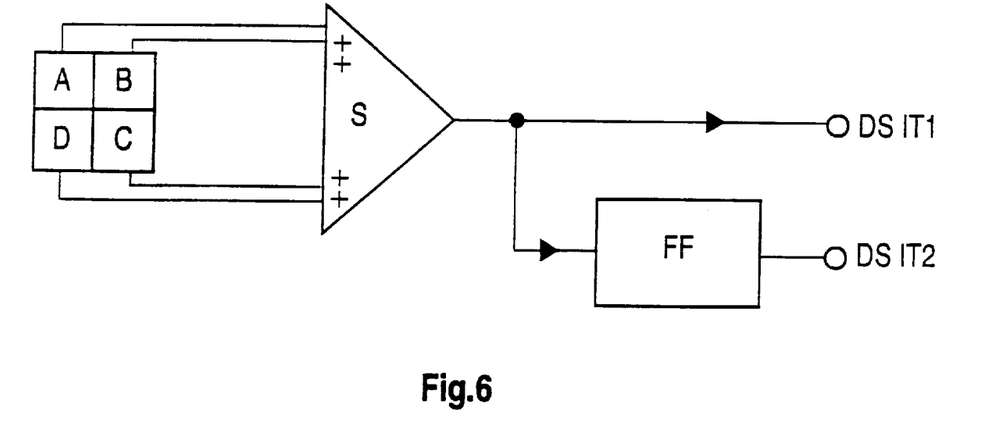
FIG. 6 shows a schematic sketch of the acquisition of data signals for information carriers having different storage densities.
Figure 7A:
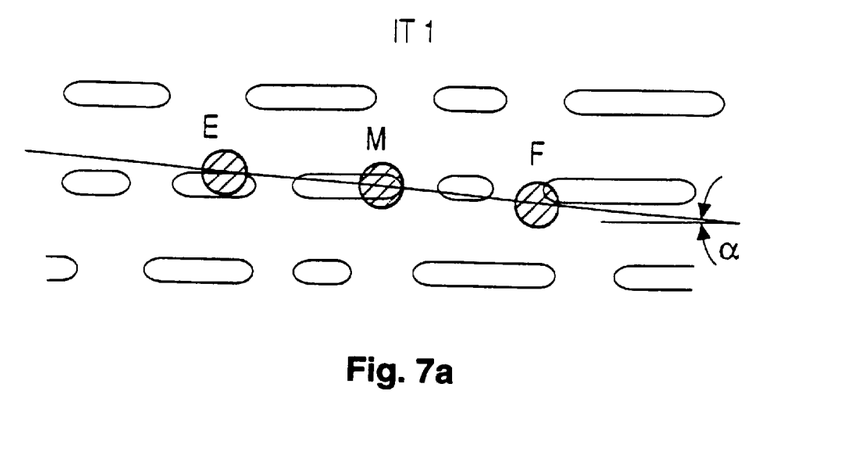
FIGS. 7A and 7B show schematic sketches of the tracks and spots for information carriers having double or half the storage density.
Figure 7B:
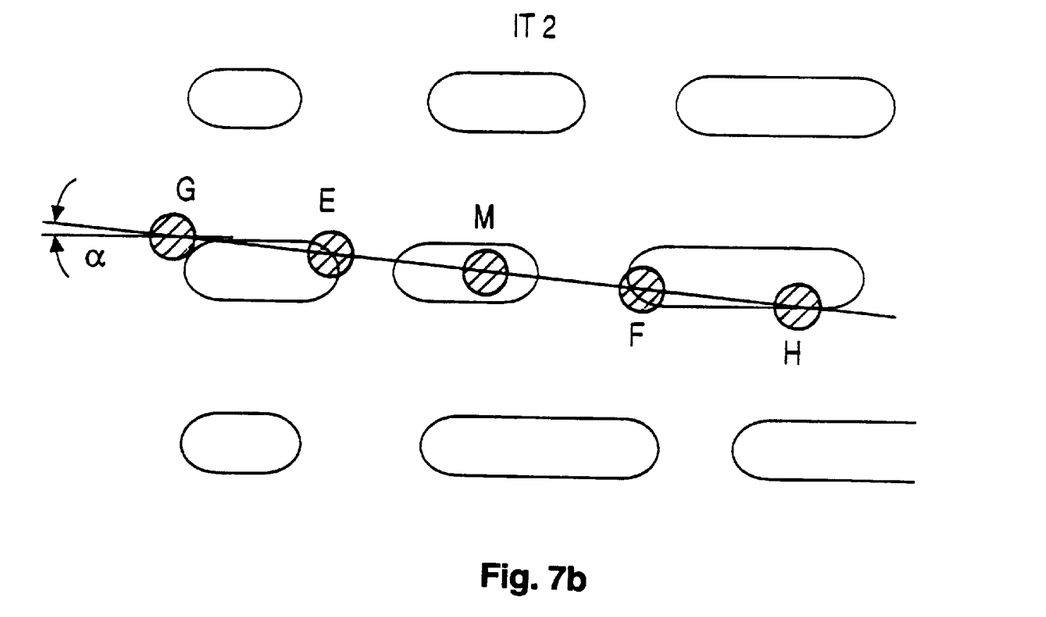

In addition to the problem of track guidance, the retrieval of information represents a further problem in information carriers of different storage density. FIG. 3 illustrates by means of the signal characteristics S1, S2 that given a different pit width different signal characteristics S1, S2 are detected as information or data signals by means of a spot SP1. The signal characteristics S1, S2 represent the aggregate signal of the photodetector PM, which comprises the sectors ABCD. Shown by way of example in FIG. 3b is a spot SP2 having a size such as would be used in a device for information carriers IT2. In order, nevertheless, to obtain the actual information signal from the originally falsified signal characteristic S2, although a light spot of smaller dimensions is used for scanning, a means is provided which evaluates the rise in the signal characteristic S2. This means is preferably formed by a flipflop. FIG. 6 shows an appropriate circuit arrangement, in which the data signal of the information carrier DSIT1 is obtained directly or as DSIT2 via a flipflop FF at the output of a summation amplifier S which provides the aggregate signal of four quadrants A, B, C, D. A rising and subsequently falling edge of the signal characteristic S2 are detected by means of a flipflop FF. Since the signal itself has an eight-to-fourteen modulation, the data signal can be directly reconstructed. The reason for this is the fact that the eight-to-fourteen modulation is a symmetrical code. The sign of the signal is thus insignificant. With another type of modulation, the rise of the S curve of the signal characteristic S2 would have to be evaluated directly in order to reconstruct the original data signal exactly.

I claim:

1. Recording and/or playback device for optical information carriers having different track widths comprising:
   means for track guidance according to the three beam method;
   an optical system comprising
      a main beam having a wavelength and numerical aperture matched to a smallest track width for providing an information signal,
      a plurality of secondary beams matched to respective track widths of said optical information carriers having different track widths, and
      a number of secondary beam detector pairs which correspond to said different track widths for providing a track error signal according to the track width of the respective information carriers; and
   means for detecting changes in said information signal, wherein
   said information signal is provided from an information carrier having a wider track width than a spot diameter from said main beam matched to said smallest track width.

2. Recording and/or playback device according to claim 1, wherein the optical system for generating a plurality of secondary beams has grids having grid structures rotated relative to one another by an angle according to the track widths of the information carriers.

3. Recording and/or playback device according to claim 1, wherein said means for detecting changes in the signal of the information carrier is a flip-flop used as means for reconstructing the information or data signal of are optical information carrier having a track width broader than the track width of the information carrier having the smallest track width.

4. Recording and/or playback device according to claim 1, wherein said secondary beams are arranged on edges of a corresponding track.

5. Recording and/or playback device according to claim 1, wherein said secondary beams are higher order beams matched to said track widths.

* * * * *